(12) United States Patent
Hakii

(10) Patent No.: US 7,880,959 B2
(45) Date of Patent: Feb. 1, 2011

(54) DISPLAY ELEMENT

(75) Inventor: Takeshi Hakii, Sagamihara (JP)

(73) Assignee: Konica Minolta Holdings, Inc. (JP)

( * ) Notice: Subject to any disclaimer, the term of this patent is extended or adjusted under 35 U.S.C. 154(b) by 124 days.

(21) Appl. No.: 12/441,701

(22) PCT Filed: Aug. 28, 2007

(86) PCT No.: PCT/JP2007/066633

§ 371 (c)(1),
(2), (4) Date: Mar. 17, 2009

(87) PCT Pub. No.: WO2008/035547

PCT Pub. Date: Mar. 27, 2008

(65) Prior Publication Data

US 2009/0268275 A1    Oct. 29, 2009

(30) Foreign Application Priority Data

Sep. 20, 2006    (JP) ............................. 2006-254128

(51) Int. Cl.
*G02F 1/00* (2006.01)
(52) U.S. Cl. ...................... 359/321; 359/265
(58) Field of Classification Search ................ 359/321, 359/265, 296–298; 345/105, 107; 205/95, 205/585; 430/52, 104, 112, 393; 564/1, 564/461, 462, 468, 503, 511
See application file for complete search history.

(56) References Cited

U.S. PATENT DOCUMENTS

| 7,184,198 B2* | 2/2007 | Kokeguchi et al. .......... 359/296 |
| 7,324,259 B2* | 1/2008 | Kokeguchi et al. .......... 359/265 |
| 7,773,285 B2* | 8/2010 | Kokeguchi ................ 359/270 |
| 2001/0014420 A1 | 8/2001 | Takeuchi et al. |
| 2006/0203535 A1 | 9/2006 | Ishii et al. |
| 2009/0207479 A1* | 8/2009 | Ijima et al. ................. 359/297 |
| 2010/0165449 A1* | 7/2010 | Hakii ........................ 359/297 |

FOREIGN PATENT DOCUMENTS

| EP | 1 699 063 A1 | 9/2006 |
| JP | 9-309173 A | 12/1997 |
| JP | 2005-338515 A | 12/2005 |
| JP | 2006-227488 A | 8/2006 |
| JP | 2006-243353 A | 9/2006 |
| WO | 97/35351 | 9/1997 |

OTHER PUBLICATIONS

International Search Report for International Application No. PCT/JP2007/066633 mailed Dec. 4, 2007 with English Translation.
English Search Report for Application No./Patent No. 07806124.9-1228/2058700 PCT/JP2007/066633 dated Mar. 11, 2010.

* cited by examiner

*Primary Examiner*—Loha Ben
(74) *Attorney, Agent, or Firm*—Cantor Colburn LLP

(57) ABSTRACT

Disclosed is display element which is constituted of simple members, can be driven at a relatively low voltage, exhibits high display contrast and white display reflectance, and can achieve a high display speed, comprising an electrolyte layer between opposed electrodes, and the electrolyte layer containing silver or a compound including silver in the chemical structure, wherein the opposed electrodes are driven so that the silver is dissolved or deposited and the electrolyte layer contains a mercapto compound having a sulfonamido group or a carbamido group in the molecule.

10 Claims, No Drawings

DISPLAY ELEMENT

CROSS REFERENCE TO RELATED APPLICATIONS

This is a U.S. national stage of application No. PCT/JP2007/066633, filed on 28 Aug. 2007. Priority under 35 U.S.C. §119(a) and 35 U.S.C. §365(b) is claimed from Japanese Application No. 2006-254128, filed 20 Sep. 2006, the disclosure of which is also incorporated herein by reference.

TECHNICAL FIELD

The present invention relates to electrochemical display elements employing solution deposition of silver.

TECHNICAL BACKGROUND

Recently, along with enhancement of the operating speed of personal computers, the spread of network infrastructure, and increased and lower-priced mass storage, data of documents or image, which were conventionally printed on paper, can be received simply as electronic information so that opportunities to read such electronic information have increased dramatically.

There were used, as a means for reading electronic information, conventional liquid crystal displays or CRTs and recent emission type displays, such as organic electroluminescence displays. Specifically, when electronic data is document data, it is necessary to notice this reading means over a relatively long period of time. It is hard to say that such an action is a kindly means to humans. There are generally known disadvantages of emission type displays such that flickering tires human eyes, they are awkward to carry about, the reading posture is restricted, it is necessitated to gaze at a stationary picture plane, and electric power consumption increases when reading over a long time.

As a display means to redeem the foregoing disadvantages is known a reflective display having memory which employs external light and does not consume electrical power for image retention. However, based on the reasons below, it is hard to say that such displays provide sufficient performance.

For instance, a system using a polarizing plate such as a reflective liquid crystal display exhibits a relatively low reflectance of up to 40%, resulting in difficulty in displaying whiteness and methods of preparing constituent members are not necessarily simple. A polymer dispersed liquid crystal display requires a relatively high voltage and employment of the difference in refractive index between organic compounds does not result in images with sufficient contrast. A polymer networked liquid crystal display has problems such that it requires a relatively high voltage and a complex TFT circuit to enhance memory. An electrophoretic display element needs relatively high voltage of more than 10 V, and there is a concern of durability of the electrophoretic particles, due to their tendency to coagulate. An electrochromic display element, which can be driven at a relatively low voltage of not more than 3 V, has problems that it is insufficient in color quality of black or colors (such as yellow, magenta, cyan, blue, green and red) and its display cells require complex layer arrangement such as a deposit layer to maintain memory.

There is known, as a display system to overcome these disadvantages of the foregoing systems, an electro-deposition (hereinafter, also denoted simply as ED) system which employs dissolution-deposition of metals or metal salts. The ED system, which can be driven at a relatively low voltage of not more than 3 V, exhibits advantages such as simple cell constitution and being superior in black and white contrast and in black color quality. There were disclosed various methods (as described in, for example, Patent documents 1-3).

As a result of the inventor's detailed study of the technique disclosed in the foregoing patent documents, it was proved that in conventional techniques, performances of a display element, including a display speed were insufficient. Techniques for controlling the display speed include, for example, addition of a compound capable of forming a complex with a silver ion. Such a compound capable of forming a complex with a silver ion was low in solubility in an electrolyte solvent, such as propylene carbonate or γ-butyrolactone, so that it was difficult to choose in terms of a display element performance. There was also studied a technique of addition of an electrolyte solvent such as dimethylsulfoxide to enhance solubility of a compound capable of forming a complex with a silver ion. However, detailed study of these techniques revealed that the use of dimethylsulfoxide as an electrolyte solvent resulted in unfavorable display unevenness when repeatedly driven.

Patent document: U.S. Pat. No. 4,240,716
Patent document 2: Japanese Patent No. 3428603
Patent document 3: JP-A No. 2003-241227 (hereinafter, JP-A refers to Japanese Patent Application publication)

SUMMARY

At least an embodiment of a display element has come into being in view of the above-described problems, and at least an embodiment of a display element which may include simple members, can be driven at a relatively low voltage, exhibits high display contrast and white display reflectance, and can achieve a high display speed.

At least some possible embodiments of a display element may be described as:

1. A display element comprising opposed electrodes and an electrolyte layer between the opposed electrodes, and the electrolyte layer containing silver or a compound including silver in the chemical structure, wherein the opposed electrodes are driven so that the silver is dissolved or deposited and the electrolyte layer further contains a mercapto compound having a sulfonamido group or a carbamido group in the molecule.

2. The display element described in the foregoing 1, wherein the mercapto compound is a mercaptotriazole compound or a mercaptooxadiazole compound.

3. The display element described in the foregoing 2, wherein the mercaptotriazole compound or the mercaptooxadiazole compound is represented by the formula (1) or (2):

Formula (1)

Formula (2)

wherein $R_1$ is a hydrogen atom, an alkyl group or an aryl group; $R_2$ is an aryl group or a heterocyclic group, each of which may be substituted and contains at least a sulfonamido group or a carbamido group in the molecule.

4. The display element described in any one of the foregoing 1 to 3, wherein the electrolyte contains a solvent which is a cyclic carboxylic acid ester.

5. The display element described in any one of the foregoing 1 to 4, wherein the requirement defined in the expression (1) is satisfied:

$$0 \leq [X]/[Ag] \leq 0.1 \qquad \text{Expression (1)}$$

wherein [X] is a molar concentration (mol/kg) of a halogen ion or a halogen atom contained in the electrolyte, and [Ag] is a total molar concentration (mol/kg) of the silver contained in the electrolyte or the silver included in the compound including silver in the chemical structure.

At least an embodiment of a display element has come into being in view of the above-described problems, and at least an embodiment of a display element which may include simple members, can be driven at a relatively low voltage, exhibits high display contrast and white display reflectance, and can achieve a high display speed.

DETAILED DESCRIPTION

As a result of study of the above-described problems, a display element which is constituted of simple members, can be driven at a relatively low voltage and exhibits high display contrast and a superior memory effect, can be realized by a display element comprising opposed electrodes and an electrolyte containing silver or a compound including silver in the chemical structure between the opposed electrodes, wherein the opposed electrodes are driven so that the silver is dissolved or deposited and (1) a display element in which the electrolyte contains a mercapto compound having a sulfonamido group or a carbamido group in the molecule, (2) a display element in which the mercapto compound is a mercaptotriazole compound or a mercaptooxadiazole compound or (3) a display element in which the mercaptotriazole compound or the mercaptooxadiazole compound is represented by the above-described formula (1) or (2).

At least an embodiment of a display element is a display element which comprises opposed electrodes having therebetween an electrolyte containing silver or a compound including silver in its chemical structure and the opposed electrodes are driven so as to results in dissolution and deposition of silver.

Silver or Compound Containing Silver in Chemical Structure:

The term "silver or compound containing silver in its chemical structure" is a general term referring to a compound such as silver oxide, silver sulfide, metallic silver, colloidal silver particles, silver halide, silver complex compounds, or silver ions, and phase states such as a solid state, a dissolved state in a liquid, or a gaseous state, as well as charge states such as a neutral state, an anionic state, or a cationic state are not particularly specified.

The display element is featured in that the electrolyte contains a mercapto compound having a sulfonamido group or a carbamido group in the molecule. Mercapto compounds may be used singly or in combination. The molar ratio of mercapto compounds to Ag ions of the electrolyte is preferably in the range of from 2 to 5.

Possible mercapto compounds include a mercaptotriazole compound, a mercaptooxadiazole compound and a mercaptothiadiazole compound. Of these are specifically preferred a mercaptotriazole compound and a mercaptooxadiazole compound.

Specific examples of the mercapto compounds are shown below but are not limited to these. The compound represented by the formula (1) or (2) will be described later.

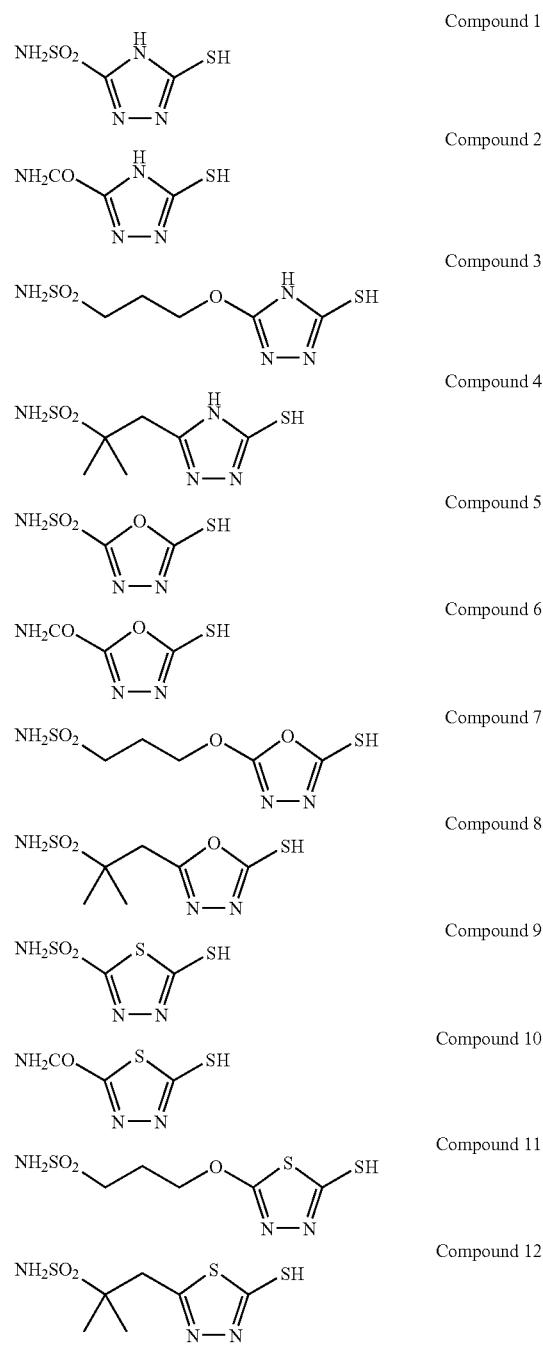

There will be described the compound represented by the formula (1) or (2).

In the formula (1), $R_1$ represents a hydrogen atom, an alkyl group or an aryl group. Examples of an alkyl group include, a methyl group, ethyl group, propyl group, isopropyl group, tert-butyl group, pentyl group, hexyl group, octyl group, dodecyl group, tridecyl group, tetradecyl group, and pentadecyl group; examples of an aryl group include a phenyl group and naphthyl group. These groups may be substituted.

In the formula (1) or formula (2), $R_2$ represents an aryl group or a heterocyclic group. Examples of an aryl group include a phenyl group and naphthyl group; and examples of a heterocyclic group include a pyrrole group, furan group, thiophene group, imidazole group, oxazole group, thiazole group, pyrazole group, isooxazole group, isothiazole group, pyridine group, pyridazine group, pyrimidine group, pyrazine group, piperidine group, piperazine group, and morpholine group. These aryl or heterocyclic groups, each may be substituted, and at least one sulfonamido group or carbamido group is included in the aryl or heterocyclic group.

Specific examples of the compound represented by the formula (1) are shown below but the invention is not limited to these exemplified compounds.

1-1
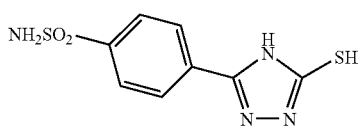

1-2
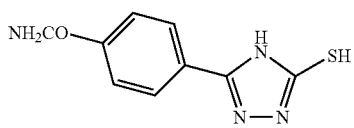

1-3
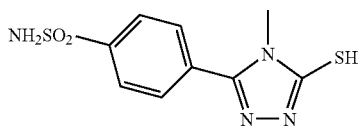

1-4
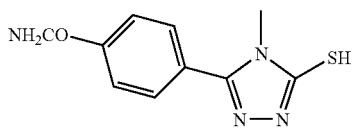

1-5
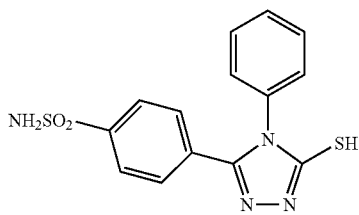

1-6
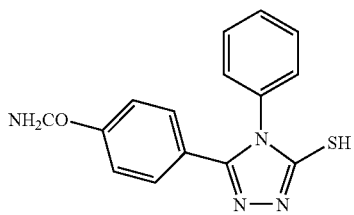

1-7
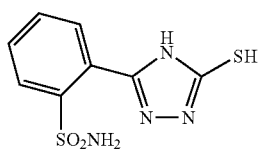

1-8
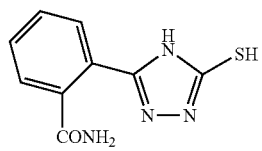

1-9
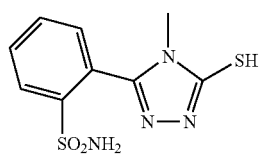

1-10
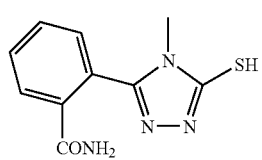

1-11
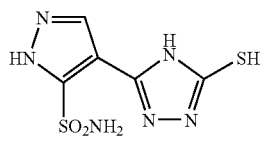

1-12
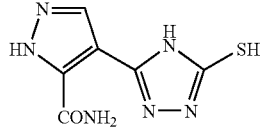

1-13
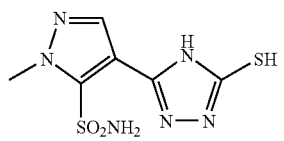

1-14
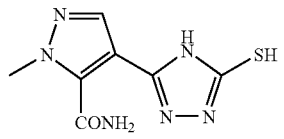

1-15

1-16

Specific examples of the compound represented by the formula (2) are shown below but the invention is not limited to these exemplified compounds.

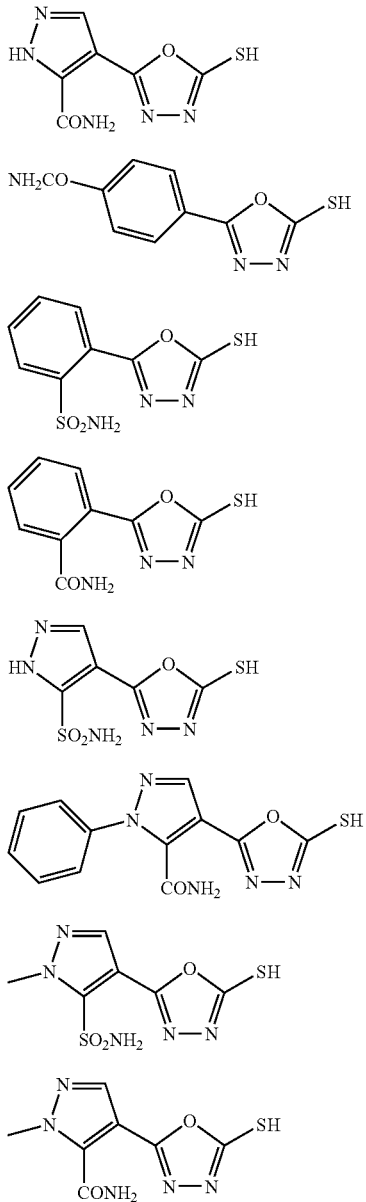

In at least an embodiment of the display element, when is defined as a total molar concentration (mol/kg) of the silver contained in the electrolyte or the silver included in the compound including silver in the chemical structure and [X] is defined as a molar concentration (mol/kg) of a halogen ion or a halogen atom contained in the electrolyte, preferably, the following requirement represented by the expression (1) is satisfied:

$$0 \leq [X]/[Ag] \leq 0.1. \quad \text{Expression (1)}$$

The halogen may include iodine, chlorine, bromine and fluorine.

A ratio [X]/[Ag] of more than 0.01 produces $X^- \rightarrow X_2$ in an oxidation-reduction reaction of silver and the produced $X_2$ readily causes cross-oxidation to allow the black silver to be dissolved, becoming one of factors resulting in reduced memory capacity. The molar concentration ratio of halogen atom to silver is preferably as low as possible.

The presence of a halogen tends to cause lowering of a memory property but when no halogen ion is contained, conductivity of an electrolyte is reduced, resulting in a retarded driving speed. Accordingly, it is preferred to contain a small amount of a halogen which falls within a range not adversely affecting a memory property, and $0.01 \leq [X]/[Ag] \leq 0.1$ is preferred. Regarding the kind of halogens when adding halogen ions, the total concentration of the individual halogen is preferably [I]<[Br]<[Cl]<[F].

The concentration of silver ions contained in the electrolyte layer, [Ag] is preferably 0.2 mol/L<[Ag]<2.0 mol/L. A silver ion concentration of less than 0.2 mol/L becomes a dilute silver solution, resulting in reduced driving speed and a silver ion concentration exceeding 2 mol/L results in deteriorated solubility and disadvantageously tends to cause deposition when aged at a relatively low temperature.

Electrolyte Solvent:

In at least an embodiment of the display element, the electrolyte layer preferably contains at least one solvent selected from propylene carbonate, ethylene carbonate, ethyl methyl carbonate, dimethyl carbonate, butylene carbonate, γ-butyl lactone, tetramethylurea, 1,3-dimethyl-2-imidazolidinone, 2-(N-methyl)-2-pyrrolidinone, hexamethylphosphoric triamide, N-methylpropionic acid amide, N,N-dimethylacetoamide, N-methylacetoamide, N,N-dimethylformamide, N-methylformamide, butylonitrile, propionitrile, acetonitrile, 4-methyl-2-pentanone, 2-butanol, 1-butanol, 2-propanol, 1-propanol, ethanol, methanol, acetic acid anhydride, ethyl acetate, ethyl propionate, dimethoxyethane, diethoxyfuran, tetrahydrofuran, ethylene glycol, diethylene glycol, triethylene glycol monobutyl ether and water.

Of the above-described solvents is preferred the use of a cyclic carboxylic acid ester. Examples of such a cyclic carboxylic acid ester include propylene carbonate, ethylene carbonate, ethyl methyl carbonate, diethyl carbonate, diethyl carbonate, dimethyl carbonate, butylene carbonate and γ-butyl lactone.

Of the above-described solvents is preferred the use of an electrolytic solvent exhibiting a dielectric constant of 30 to 80.

Other usable solvents include compounds described in J. A. Riddick, W. B. Bunger, T. K. Sakano, "Organic Solvents" 4th e., John Wiley & Sons (1986); Y. Marcus, "Ion Solvation", John Wiley & Sons (1985); C. Reichardt, "Solvents and Solvent Effects in Chemistry", 2nd ed., VCH (1988); G. J. Janz, R. P. T. Tomkins, "Nonaqueous Electrolytes Handbook" Vol. 1, Academic Press (1972).

Electrolyte Material:

In at least an embodiment of the display element, a liquid electrolyte can contain therein compounds as below. Listed as potassium compounds are KCl, KI, and KBr; listed as lithium compounds are $LiBF_4$, $LiClO_4$, $LiPF_6$, and $LiCF_3SO_3$; while listed as tetraalkylammonium compounds are tetraethylammonium perchlorate, tetrabutylammonium perchlorate, tetraethylammonim borofluoride, tetrabutylammonium borofluoride, and tetrabutylammonium halide. In addition, there are preferably used fused salt electrolyte compositions described in paragraphs [0062]-[0081] of JP-A No. 2003-187881. Further, there are also usable compounds which form oxidation-reduction pairs such as $I^-/I_3^-$, $Br^-/Br_3^-$ and quinone/hydroquinone.

Further, a solid electrolyte can contain therein compounds exhibiting electronic or ionic conductivity, as described below.

Examples of such compounds include fluorinated vinyl based polymers containing perfluorosulfonic acid, polythiophene, polyaniline, polypyrrole, triphenylamines, polyvinylcarbazoles, polymethylphenylsilanes, calcogenides such as $Cu_2S$, $Ag_2S$, $Cu_2Se$, and $AgCrSe_2$, fluorine compounds such as $CaF_2$, $PbF_2$, $SrF_2$, $LaF_3$, $TlSn_2F_5$, and $CeF_3$, lithium salts such as $Li_2SO_4$, $Li_4SiO_4$ and $Li_3PO_4$ and compounds such as $ZrO_2$, $CaO$, $Cd_2O_3$, $HfO_2$, $Y_2O_3$, $Nb_2O_5$, $WO_3$, $Bi_2O_3$, AgBr, AgI, CuCl, CuBr, CuBr, CuI, LiI, LiBr, LiCl, $LiAlCl_4$, $LiAlF_4$, AgSBr, $C_5H_5NHAg_5I_6$, $Rb_4Cu_{16}I_7Cl_{13}$, $Rb_3CU_7Cl_{10}$, LiN, $Li_5NI_2$, and $Li_6NBr_3$.

There may be employed, as supporting electrolytes, electrolytes in gel form. When electrolytes are nonaqueous, there may be used oil gelling agents described in paragraphs [0057]-[0059] of JP-A No. 11-185836.

White Particle Added to Electrolyte:

In at least an embodiment of the display element, the electrolyte layer preferably contains white particles.

Examples of white particles include titanium oxide (anatase type or rutile type), barium sulfate, calcium carbonate, aluminum oxide, zinc oxide, magnesium oxide, zinc hydroxide, magnesium hydroxide, magnesium phosphate, magnesium hydrogen phosphate, alkaline earth metal salts, talc, kaolin, zeolite, acid clay, glass, and organic compounds such as polyethylene, polystyrene, acryl resin, ionomer, ethylenevinyl acetate copolymer resin, benzoguanamine resin, ureaformalin resin, melamine-formalin resin and polyamide resin. These may be used singly or mixed in combination, or in the form having voids within a particle to vary a refractive index.

Of the foregoing white particles, titanium dioxide, zinc oxide or zinc hydroxide is preferred. There is also usable titanium oxide which has been surface-treated with an inorganic oxide [$Al_2O_3$, AlO(OH), $SiO_2$] or treated with organic materials such as trimethylolethane, triethanolamine acetate or trimethylcyclosilane, in addition to the foregoing surface-treatment.

Of these white particles, titanium oxide or zinc oxide is more preferred in terms of prevention of coloring at a high temperature and reflectance of the element, due to refractive index.

Thickening Agents Added to Electrolyte Layer:

In at least an embodiment of the display element, there may be used thickening agents in the electrolyte layer. Examples thereof include gelatin, gum Arabic, poly(vinyl alcohol), hydroxyethyl cellulose, hydroxypropyl cellulose, cellulose acetate, cellulose acetate butyrate, poly(vinylpyrrolidone), poly(alkylene glycol), casein, starch, poly(acrylic acid), poly(methylmethacrylic acid), poly(vinyl chloride), poly(methacrylic acid), copoly(styrene-maleic anhydride), copoly(styrene-acrylonitrile), copoly(styrene-butadiene), poly(vinyl acetals) (for example, poly(vinyl formal), poly(vinyl butyral)), poly(vinyl esters), poly(urethanes), phenoxy resins, poly(vinylidene chloride), poly(epoxides), poly(carbonates), poly(vinyl acetate), cellulose esters, poly(amides), as well as polyvinyl butyral, cellulose acetate, cellulose acetate butyrate, polyester, polycarbonate, poly(acrylic acid), and polyurethane as a transparent hydrophobic binder.

These thickening agents may be used in combination. There are further cited the compounds described on pages 71-75 of JP-A No. 64-13546. Of these, polyvinyl alcohols, polyvinylpyrrolidones, hydroxypropyl celluloses, and polyalkylene glycols are preferably used in terms of compatibility with various types of additives and enhancement of dispersion stability of white particles.

Other Additives to Electrolyte Layer:

Auxiliary layers of the display element may include a protective layer, a filter layer, an antihalation layer, a crossover light cutting layer, and a backing layer. These auxiliary layers may contain chemical sensitizers, noble metal sensitizers, photosensitive dyes, supersensitizers, high boiling point solvents, antifoggants, stabilizers, development inhibitors, bleach accelerators, fixing accelerators, color mixing inhibitors, formalin scavengers, toners, hardeners, surface active agents, thickening agents, plasticizers, lubricants, UV absorbents, anti-irradiation dyes, filter light absorbing dyes, fungicides, polymer latexes, heavy metals, antistatic agents, and matting agents.

The additives described above are detailed in Research Disclosure (hereinafter denoted simply as RD) Volume 176 Item/17643 (December 1978), RD Volume 184 Item/18431 (August 1979), DR Volume 187 Item/18716 (November 1979), and RD Volume 308 Item/308119 (December 1989).

Types of compounds cited in RD are listed below.

| Additives | RD 17643 | | RD 18716 | | RD 308119 | |
|---|---|---|---|---|---|---|
| | Page | Section | Page | Section | Page | Section |
| Chemical Sensitizers | 23 | III | 648 | right top | 96 | III |
| Sensitizing Dyes | 23 | IV | 648-649 | | 996-8 | IV |
| Desensitizing Dyes | 23 | IV | | | 998 | IV |
| Dyes | 25-26 | VIII | 649-650 | | 1003 | VIII |
| Development Accelerators | 29 | XXI | 648 | right top | | |
| Antifoggant Stabilizer | 24 | IV | 649 | right top | 1006-7 | VI |
| Optical Brightening Agents | 24 | V | | | 998 | V |
| Hardeners | 26 | X | 651 | left | 1004-5 | X |
| Surfactants | 26-7 | XI | 650 | right | 1005-6 | XI |
| Antistatic Agents | 27 | XII | 650 | right | 1006-7 | XIII |
| Plasticizers | 27 | XII | 650 | right | 1006 | XII |
| Lubricants | 27 | XII | | | | |
| Matting Agents | 28 | XVI | 650 | right | 1008-9 | XVI |
| Binders | 26 | XXII | | | 1003-4 | IX |
| Supports | 28 | XVII | | | 1009 | XVII |

Layer Configuration:

The layer configuration between opposed electrodes related to the display element will now be described in more detail.

As the layer configuration related to the display element, it is possible to arrange a constituting layer containing positive hole transport materials. Examples of positive hole transport materials include aromatic amines, triphenylene derivatives, oligochiophene compounds, polypyrroles, polyacetylene derivatives, polyphenylene vinylene derivatives, polythienylene vinylene derivatives, polythiophene derivatives, polyaniline derivatives, polytoluidine derivatives, CuI, CuSCN, $CuInSe_2$, Cu(In,Ga)Se, $CuGaSe_2$, $Cu_2O$, CuS, $CuGaS_2$, $CuInS_2$, $CuAlSe_2$, GaP, NiO, CoO, FeO, $Bi_2O_3$, $MoO_2$, and $Cr_2O_3$.

Substrate:

There are preferably employed as substrates plastic films composed of polyolefins such as polyethylene or polypropylene, polycarbonates, cellulose acetate, polyethylene terephthalate, polyethylene dinaphthalene dicarboxylate, polystyrene naphthalates, polyvinyl chloride, polyimide, polyvinyl acetals, and polystyrene. In addition, preferred are syndiotactic structure polystyrenes. These are prepared employing the methods described, for example, in each of JP-A Nos. 62-117708, 1-46912, and 1-178505. Further, examples of supports include metal substrates including stainless steel, paper supports such as baryta paper or resin coated paper, supports including the above plastic film having thereon a reflection layer, and those which are described in JP-A No. 62-253195 (pages 29-31) as a support. There are also preferably used those described on page 28 of RD No. 17643, from the right column on page 647 to the left column on page 648 of RD No. 18716, and on page 879 of RD No. 307105. As described in U.S. Pat. No. 4,141,735, these supports may be subjected to a thermal treatment at a temperature lower than Tg so that core-set curl is decreased.

Furthermore, the surface of these supports may be subjected to a surface treatment with the aim of enhancement of adhesion of the support to other constituting layers. There may be employed as surface treatments a glow discharge treatment, an ultraviolet radiation irradiation treatment, a corona treatment and a flame treatment. Further there may be employed supports described on pages 44-149 of Kochi Gijutsu No. 5 (published by AZTEC Corp., dated Mar. 22, 1991). There are further cited "Supports" described on page 1009 of RD No. 308119 and on page 108 of Product Licensing Index Volume 92. In addition, there are also usable glass substrates and epoxy resins kneaded with glass powder.

Electrode:

In at least an embodiment of the display element, it is preferable that at least one of the opposed electrodes is a metal electrode. There may be employed, as a metal electrode, metals such as platinum, gold, silver, copper, aluminum, zinc, nickel, titanium, or bismuth and alloys thereof, which are known in the art. Preferred metals employed in the metal electrodes are those which exhibit a work function near the oxidation-reduction potential of silver in electrolytes. Of these, a silver electrode or an electrode having a silver content of at least 80 percent is advantageous to maintain a reduced state of silver, which also is superior in anti-staining of electrodes. Methods for preparing electrodes can employ conventional ones such as a evaporating method, a printing method, an ink-jet method, a spin coating method, and a CVD method.

Further, at least an embodiment of the display element preferably comprises a transparent electrode as at least one of the opposed electrodes. Transparent electrodes are not particularly limited so far as they are transparent and electrically conductive. Examples thereof include indium tin oxide (ITO), indium zinc oxide (IZO), fluorine-doped tin oxide (FTO), indium oxide, zinc oxide, platinum, gold, silver rhodium, copper, chromium, carbon, aluminum, silicon, amorphous silicon, and BSO (bismuth silicon oxide). Such electrodes as described above can be formed, for example, in the manner that an ITO layer may be subjected to mask evaporation on a substrate employing a sputtering method, or after forming an ITO layer on the entire surface, patterning may be performed employing a photolithographic method. The surface resistance value is preferably 100 $\Omega/cm^2$ or less, and is more preferably 10 $\Omega/cm^2$ or less. The thickness of the transparent electrodes is not particularly limited but is commonly 0.1-20 µm.

Other Components Constituting the Display Element:

The display element may optionally employs sealing agents, pillar-shaped materials, and spacer particles.

Sealing agents are those to seal materials so that they do not leak out. There may be employed, as sealing agents, heat curing, light curing, moisture curing, and anaerobic curing resins such as epoxy resins, urethane resins, acryl resins, vinyl acetate resins, ene-thiol resins, silicone resins, or modified polymer resins.

Pillar-shaped materials provides strong self-supporting (i.e., strength) between substrates. Examples thereof include a cylindrical form, a quadrangular form, an elliptic cylindrical form, and a trapezoidal form, which are arranged at definite intervals in a specified pattern such as a lattice. Further, there may be employed stripe-shaped ones arranged at definite intervals. It is preferable that the pillar-shaped materials are not randomly arranged but arranged at an equal distance, arranged so that the interval gradually varies, or a predetermined pattern is repeated at a definite cycle so that the distance between substrates is appropriately maintained and image display is not hindered. When 1 to 40% of the display region of a display element is accounted for by the pillar-shaped materials, sufficient strength for commercial viability is achieved as a display element.

There may be provided a spacer between paired substrates to maintain a uniform gap between them. Examples of such a spacer include spherical materials composed of resins or inorganic oxides. Further, adhesion spacers are suitably employed the surface of which is coated with thermoplastic resins. In order to maintain the uniform gap between substrates, there may be provided only pillar-shaped materials. However, there may be provided both spacers and pillar-shaped materials. In place of the pillar-shaped materials, only spacers may be employed as a space-holding member. The diameter of spacers, when a pillar-shaped material is formed, is not more than its height, and is preferably equal to the height. When the column-structured material is not formed, the diameter of spacers corresponds to the distance of the cell gap.

Screen Printing:

Sealing agents, pillar-shaped materials, and electrode patterns can be formed employing a screen printing method. In screen printing methods, a screen on which predetermined patterns are formed is covered on the electrode surface, and printing materials (compositions to form column-structured materials such as light-curing resins) are placed on the screen. Subsequently, a squeegee is moved at a predetermined pressure, angle and rate, whereby the printing materials are transferred onto the above substrate via the pattern of the screen. Then, the transferred materials are thermally cured and dried. When pillar-shaped materials are formed employing the screen printing method, resin materials are not limited to light-curable resins, but there may also employed, for example, heat curable resins such as epoxy resins or acryl resins and thermoplastic resins. Examples of thermoplastic resin include a polyvinyl chloride resin, a polyvinylidene chloride resin, a polyvinyl acetate resin, a polymethacrylic acid ester resin, a polyacrylic acid ester resin, a polystyrene resin, a polyamide resin, a polyethylene resin, a polypropylene resin, a fluorocarbon resin, a polyurethane resin, a polyacrylonitrile resin, a polyvinyl ether resin, a polyvinyl ketone resin, a polyether resin, a polyvinyl pyrrolidone resin, a saturated polyester resin, a polycarbonate resin, and a chlorinated polyether resin. It is preferable that resin materials are employed in the form of a paste obtained through, for example, solution in suitable solvents.

As noted above, after forming the pillar-shaped materials on the substrate, spacers are provided on at least one side of the substrate, and paired substrates are placed so that the electrode forming surfaces are opposed to each other, whereby an empty cell is formed. By heating the paired opposing substrates, they are allowed to adhere to each other under application of pressure from both sides, whereby a display cell is obtained. Preparation of a display element may be performed by injecting an electrolyte composition between the substrates, employing a vacuum injection method. Alternatively, during adhesion of substrates, an electrolyte composition may be dripped on the surface of one of the substrates and then simultaneously sealed when the substrates are allowed to adhere to each other.

Driving Method of Display Element:

In at least an embodiment of the display element, the driving operation of the afore-mentioned opposed electrodes is performed preferably by simple matrix drive.

The simple matrix drive refers to a driving method of successive application of current to a circuit in which a positive electrode line including plural positive electrodes and a negative electrode line including plural negative electrodes are opposed to each other and cross in the vertical direction. The use of a simple matrix drive enables simplification of the circuit structure and the driving IC, resulting in advantages such as lowered production cost.

The display element may employ an active matrix drive. Active matrix drive refers to a system in which scanning lines, data lines, and current feeding lines are formed in a checkered pattern and driving is performed by TFT circuits arranged in each of the squares of the checkered pattern. Since switching is performed for each pixel, advantages result in gradation as well as memory function.

Application Field of Display Element:

It is feasible to apply the display element to ID card related fields, public information related fields, transportation related fields, broadcasting related fields, account settling fields, and distribution and logistics related fields. Specific examples include door keys, student identification cards, corporate member identification cards, various club membership cards, convenience store cards, department store cards, vending machine cards, gas station cards, subway and railroad cards, bus cards, cash cards, credit cards, highway cards, driver licenses, hospital medical examination cards, health insurance cards, basic resident registers and passports.

EXAMPLES

The embodiments of the present invention will be further described with reference to examples but the invention is by no means limited to these. Designation "part(s)" or "%" used in Examples represents "part(s) by mass" or "% by mass" unless otherwise noted.

Example 1

Preparation of Electrolyte Solution 1

To 2.5 g of dimethylsulfoxide were added 75 mg of silver iodide and 150 mg of comparative compound 1 (2-mercaptobenzimidazole, also denoted simply as Comp. 1) and heated at 80° C. to obtain an electrolyte solution 1.

Preparation of Electrolyte Solution 2

An electrolyte solution 2 was prepared in the same manner as the electrolyte solution 1, except that the comparative compound 1 was replaced by comparative compound 2 (mercaptooxadiazole, also denoted simply as Comp. 2).

Preparation of Electrolyte Solution 3

An electrolyte solution 3 was prepared in the same manner as the electrolyte solution 2, except that dimethylsulfoxide was replaced by propylene carbonate.

Preparation of Electrolyte Solution 4

To 2.5 g of dimethylsulfoxide were added 75 mg of silver iodide and 150 mg of compound 4 and heated at 80° C. to obtain an electrolyte solution 4.

Preparation of Electrolyte Solution 5

An electrolyte solution 5 was prepared in the same manner as the electrolyte solution 4, except that dimethylsulfoxide was replaced by propylene carbonate.

Preparation of Electrolyte Solution 6

An electrolyte solution 6 was prepared in the same manner as the electrolyte solution 4, except that dimethylsulfoxide was replaced by γ-butyrolactone.

Preparation of Electrolyte Solution 7

An electrolyte solution 7 was prepared in the same manner as the Electrolyte solution 6, except that silver iodide was replaced by silver tosylate.

Preparation of Electrolyte Solution 8

An electrolyte solution 8 was prepared in the same manner as the electrolyte solution 7, except that the compound 8 was replaced by Compound 2.

Preparation of Electrolyte Solution 9

An electrolyte solution 9 was prepared in the same manner as the electrolyte solution 7, except that the compound 8 was replaced by Compound 11.

Preparation of Electrolyte Solution 10

An electrolyte solution 10 was prepared in the same manner as the electrolyte solution 7, except that the compound 8 was replaced by a compound 1-1.

Preparation of Electrolyte Solution 11

An electrolyte solution 11 was prepared in the same manner as the electrolyte solution 7, except that the compound was replaced by a compound 1-7.

Preparation of Electrolyte Solution 12

An electrolyte solution 12 was prepared in the same manner as the electrolyte solution 7, except that the compound was replaced by a compound 1-8.

Preparation of Electrolyte Solution 13

An electrolyte solution 13 was prepared in the same manner as the electrolyte solution 7, except that the compound 8 was replaced by a compound 2-3.

Preparation of Electrolyte Solution 14

An electrolyte solution 14 was prepared in the same manner as the electrolyte solution 7, except that the compound 8 was replaced by a compound 2-7.

Preparation of Electrolyte Solution 15

An electrolyte solution 15 was prepared in the same manner as the electrolyte solution 7, except that the compound 8 was replaced by a compound 2-8.

Preparation of Electrode 1:

An ITO film was formed on a 1.5 mm thick, 2 cm×4 cm glass substrate according to a commonly known method to obtain a transparent electrode (electrode 1).

Preparation of Electrode 2:

A silver-palladium electrode (electrode 2) with an electrode thickness of 0.8 µm was formed on a 1.5 mm thick, 1 cm×4 cm glass substrate according to a commonly known method to obtain an electrode 2.

Preparation of Electrode 3:

A mixed solution which was obtained by dispersing 20% by mass of a titanium oxide in an isopropanol solution containing 2% by mass of polyvinyl alcohol (having an average molecular weight of 3500 and a saponification degree of 87%) by use of an ultrasonic homogenizer was coated at a thickness of 100 μm on the electrode 2 bordered with an olefinic sealing agent containing spherical glass beads having an average particle diameter of 40 μm in an amount of 10% volume fraction and then dried at 15° C. for 30 min. to evaporate the solvent and further dried in an atmosphere at 45° C. for 1 hr. to prepare an electrode 3.

Preparation of Display Element

Preparation of Display Element 1:

The electrodes 3 and 4 were pasted and then pressed with heating to prepare an empty cell. The electrolyte solution 1 was poured into the empty cell and its inlet was sealed with an ultraviolet curing resin to prepare a display element 1.

Preparation of Display Elements 2-15:

Display elements 2-15 were each prepared in the same manner as the foregoing display element 1, except that the electrolyte solution 1 was replaced by electrolyte solutions 2-15, respectively.

Evaluation of Display Element

Evaluation of Solubility:

The thus prepared electrolyte solutions were each allowed to stand at room temperature for 30 min. and the presence/absence of deposition was visually observed. The amount of produced deposits was evaluated based on five levels. A lower value indicates a lesser amount of deposits. Level 1 is the level at which no occurrence of deposition was visually confirmed.

Evaluation of Display Speed:

After a voltage of 1.5 V was applied to each of the prepared display elements for 1.5 sec. to display white, a voltage of −1.5 V was applied for 0.5 sec. to display gray and its reflectance was measured by a spectral calorimeter CM-3700d, produced by Konica Minolta Sensing Inc. The thus measured reflectance was denoted as $R_{Glay}$ and the $R_{Glay}$ was indicated as an index of display speed. A low $R_{Glay}$ indicates a higher display speed.

Evaluation of Display Unevenness:

An operation of application of a voltage of 1.5 V to the individual display element for 1.5 sec. to display white, followed by application of a voltage of −1.5 V to display gray was repeated 1,000 times, thereafter, the reflectance at 550 nm in any five portions of the display element was measured by a spectral calorimeter CM-3700d, produced by Konica Minolta Sensing Inc. to determine the difference in reflectance between maximum and minimum values. The thus determined difference in reflectance was denoted as $\Delta R_{Glay}$, which was indicated as an index of display unevenness. A lower $\Delta R_{Glay}$ indicates less display unevenness.

The thus obtained results are shown in Table 1.

TABLE 1

| Display Element No. | Electrolytic Solution No. | Solvent Name | Amount | Silver Salt Name | Amount | Additive Name | Amount | [X]/[Ag] | Solubility *1 | Display Speed $R_{glay}$ | Display Unevenness $\Delta_{glay}$ | Remark |
|---|---|---|---|---|---|---|---|---|---|---|---|---|
| 1 | 1 | DMSO | 2.5 g | AgI | 75 mg | Comp. 1 | 150 mg | 1 | 1 | 40% | 23% | Comp. |
| 2 | 2 | DMSO | 2.5 g | AgI | 75 mg | Comp. 2 | 150 mg | 1 | 1 | 30% | 25% | Comp. |
| 3 | 3 | PC | 2.5 g | AgI | 75 mg | Comp. 2 | 150 mg | 1 | 5 | | *2 | Comp. |
| 4 | 4 | DMSO | 2.5 g | AgI | 75 mg | Compound 8 | 150 mg | 1 | 1 | 15% | 12% | Inv. |
| 5 | 5 | PC | 2.5 g | AgI | 75 mg | Compound 8 | 150 mg | 1 | 1 | 14% | 9% | Inv. |
| 6 | 6 | γBL | 2.5 g | AgI | 75 mg | Compound 8 | 150 mg | 1 | 1 | 12% | 8% | Inv. |
| 7 | 7 | γBL | 2.5 g | Silver tosylate | 75 mg | Compound 8 | 150 mg | 0(*3) | 1 | 8% | 7% | Inv. |
| 8 | 8 | γBL | 2.5 g | Silver tosylate | 75 mg | Compound 2 | 150 mg | 0(*3) | 1 | 9% | 10% | Inv. |
| 9 | 9 | γBL | 2.5 g | Silver tosylate | 75 mg | Compound 11 | 150 mg | 0(*3) | 1 | 10% | 8% | Inv. |
| 10 | 10 | γBL | 2.5 g | Silver tosylate | 75 mg | Compound 1-1 | 150 mg | 0(*3) | 1 | 4% | 3% | Inv. |
| 11 | 11 | γBL | 2.5 g | Silver tosylate | 75 mg | Compound 1-7 | 150 mg | 0(*3) | 1 | 2% | 1% | Inv. |
| 12 | 12 | γBL | 2.5 g | Silver tosylate | 75 mg | Compound 1-8 | 150 mg | 0(*3) | 1 | 6% | 2% | Inv. |
| 13 | 13 | γBL | 2.5 g | Silver tosylate | 75 mg | Compound 2-3 | 150 mg | 0(*3) | 1 | 4% | 2% | Inv. |
| 14 | 14 | γBL | 2.5 g | Silver tosylate | 75 mg | Compound 2-7 | 150 mg | 0(*3) | 1 | 2% | 1% | Inv. |
| 15 | 15 | γBL | 2.5 g | Silver tosylate | 75 mg | Compound 2-8 | 150 mg | 0(*3) | 1 | 5% | 3% | Inv. |

DMSO: Dimethylsulfoxide,
PC: propylene carbonate,
γ BL: γ-butyrolactone
*1: After allowed to stand for 30 min.,
*2: Evaluation being incapable,
*3: Out of detection As is apparent from the results shown in Table 1, it was proved that when comparative compound 1 or 2 was used and dimethylsulfoxide was used as an electrolyte solvent, the display speed was delayed and display unevenness occurred. It was further proved that when comparative compound 2 was used and propylene carbonate was used as an electrolyte solvent, comparative compound 2 deposited after preparation of an electrolyte solution, rendering it difficult to evaluate performance of the display element.

On the contrary, when the compound of at least an embodiment of the invention was used, there was provided a display element which was superior in solubility, display speed and display uniformity.

Specifically, it was proved that the use of a compound of the formula (1) or (2) and a cyclic carboxylic acid ester compound resulted in an enhanced display speed and an improved display uniformity.

What is claimed is:

1. A display element comprising an electrolyte layer between opposed electrodes and the electrolyte layer containing silver or a compound including silver in the chemical structure, wherein the opposed electrodes are driven so that the silver is dissolved or deposited and the electrolyte layer further contains a mercapto compound having a sulfonamido group or a carbamido group in a molecule.

2. The display element as claimed in claim 1, wherein the mercapto compound is a mercaptotriazole compound or a mercaptooxadiazole compound.

3. The display element as claimed in claim 2, wherein a mercaptotriazole compound or a mercaptooxadiazole compound is represented by the formula (1) or (2):

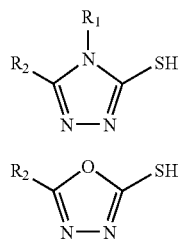

formula (1)

formula (2)

wherein $R_1$ is a hydrogen atom, an alkyl group or an aryl group; $R_2$ is an aryl group or a heterocyclic group, each of which may have a substituent and has at least one sulfonamido group or carbamido group in the molecule.

4. The display element as claimed in claim 2, wherein the electrolyte layer contains a solvent of a cyclic carboxylic acid ester.

5. The display element as claimed in claim 2, wherein the requirement defined in the expression (1) is satisfied:

$$0 \leq [X]/[Ag] \leq 0.1 \qquad \text{Expression (1)}$$

wherein [X] is a molar concentration (mol/kg) of a halogen ion or a halogen atom contained in the electrolyte layer, and [Ag] is a total molar concentration (mol/kg) of the silver contained in the electrolyte layer or the silver included in the compound having silver in the chemical structure.

6. The display element as claimed in claim 3, wherein the electrolyte layer contains a solvent of a cyclic carboxylic acid ester.

7. The display element as claimed in claim 3, wherein the requirement defined in the expression (1) is satisfied:

$$0 \leq [X]/[Ag] \leq 0.1 \qquad \text{Expression (1)}$$

wherein [X] is a molar concentration (mol/kg) of a halogen ion or a halogen atom contained in the electrolyte layer, and [Ag] is a total molar concentration (mol/kg) of the silver contained in the electrolyte layer or the silver included in the compound having silver in the chemical structure.

8. The display element as claimed in claim 1, wherein the electrolyte layer contains a solvent of a cyclic carboxylic acid ester.

9. The display element as claimed in claim 8, wherein the requirement defined in the expression (1) is satisfied:

$$0 \leq [X]/[Ag] \leq 0.1 \qquad \text{Expression (1)}$$

wherein [X] is a molar concentration (mol/kg) of a halogen ion or a halogen atom contained in the electrolyte layer, and [Ag] is a total molar concentration (mol/kg) of the silver contained in the electrolyte layer or the silver included in the compound having silver in the chemical structure.

10. The display element as claimed in claim 1, wherein the requirement defined in the expression (1) is satisfied:

$$0 \leq [X]/[Ag] \leq 0.1 \qquad \text{Expression (1)}$$

wherein [X] is a molar concentration (mol/kg) of a halogen ion or a halogen atom contained in the electrolyte layer, and [Ag] is a total molar concentration (mol/kg) of the silver contained in the electrolyte layer or the silver included in the compound having silver in the chemical structure.

* * * * *